No. 691,176. Patented Jan. 14, 1902.
P. PICARD.
ELECTRIC TELEGRAPH APPARATUS.
(Application filed Feb. 12, 1898.)
(No Model.)
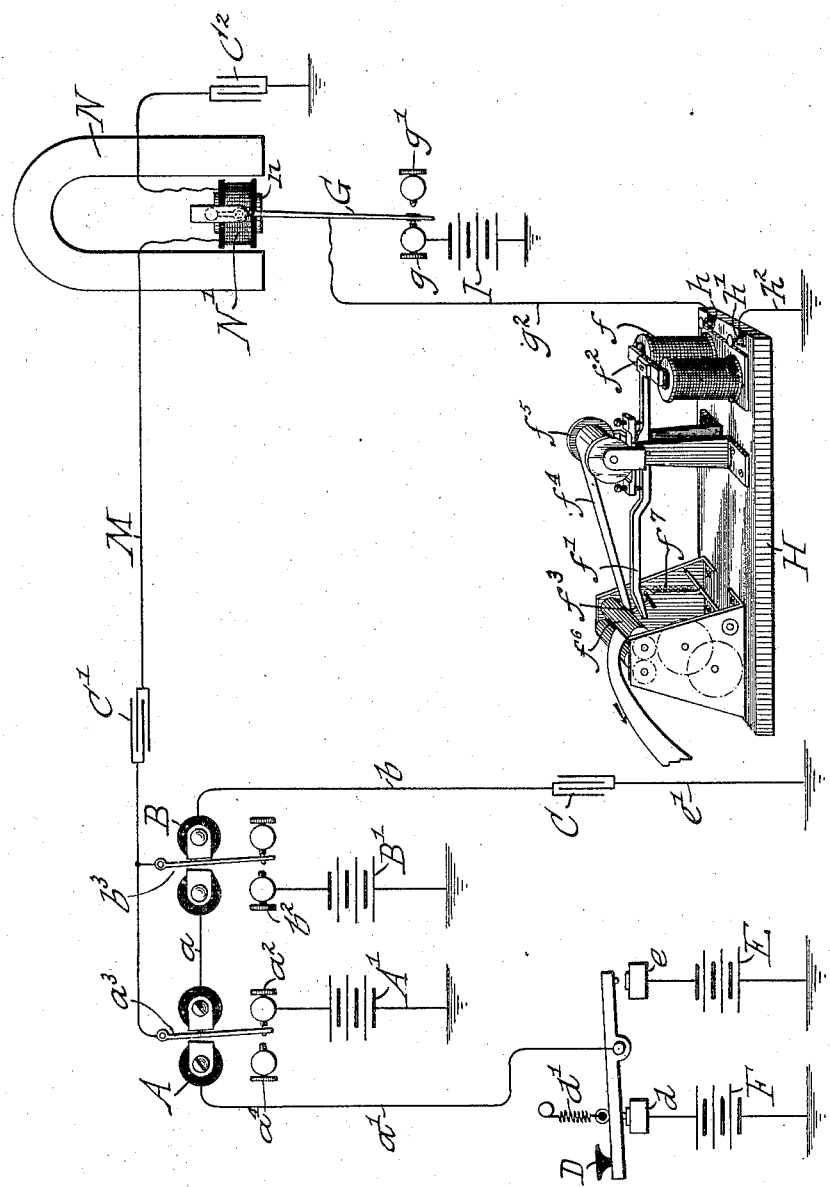
WITNESSES:
Walter Wollheim
Joseph H. Niles.
INVENTOR
Pierre Picard,
BY
ATTORNEYS ately-polarized relays, a conductor connecting the coils of said relays, a conductor
UNITED STATES PATENT OFFICE.

PIERRE PICARD, OF PARIS, FRANCE.

ELECTRIC-TELEGRAPH APPARATUS.

SPECIFICATION forming part of Letters Patent No. 691,176, dated January 14, 1902.

Application filed February 12, 1898. Serial No. 670,057. (No model.)

*To all whom it may concern:*

Be it known that I, PIERRE PICARD, a citizen of the Republic of France, residing in Paris, France, have invented certain new and useful Improvements in Electric-Telegraph Apparatus, of which the following is a specification.

This invention relates to improvements in electric-telegraph apparatus.

The object of the invention is to provide an apparatus by which telegraphy over long lines may be advantageously accomplished; and for this purpose the invention consists in the combination of a transmitting-key, two contacts therefor, two independent batteries grounded at opposite poles and connected at their other poles one with each contact, two oppositely-polarized relays, a conductor connecting the coils of said relays, a conductor connecting said key with one of said relays, a condenser, a conductor connecting the other relay with the condenser, a conductor grounding said condenser, a main line connected with the armature of each relay, two independent batteries grounded at opposite poles and connected at their other poles one with each of the active contacts of said relays, a condenser in the main line, a permanent magnet, a coil pivoted between the poles of said magnet and connected at one end with the main line, a condenser, a conductor connecting the opposite end of said coil with said condenser, a contact-arm extending from said coil, contacts for said arm, a battery grounded at one pole and connected at the other pole with one of said contacts, a recording device, a conductor connecting said contact-arm with said recording device, and a conductor connecting said recording device to earth.

The accompanying drawing is a diagram illustrating my invention.

In the drawing, D indicates a transmitting-key of the Morse type, and $d$ $e$ the contacts for the same. To the contacts are connected two independent electric batteries E and F, one to each contact, respectively. The positive pole of the battery F is connected to the contact $d$ and the negative pole of the battery E to the contact $e$, the batteries being grounded at their opposite poles, as indicated. A and B represent two polarized relays of opposite polarity, the coils of which are connected by the conductor $a$. A conductor $a'$ connects one of said relays with the key D, and a conductor $b$ connects the other relay with a condenser C, which is connected to earth by conductor $e'$. To the active contact $a^2$ of the relay A is connected the positive pole of a battery A', and to the active contact $b^2$ of the relay B is connected the negative pole of the battery B', said batteries being grounded at their other poles. The main line M is connected with the armatures $a^3$ $b^3$ of the relays, and in the main line, at the transmitting end, is interposed a condenser C'.

At the receiving-station is arranged a permanent horseshoe-magnet N, between the poles of which is freely pivoted by any suitable means a coil N', provided with a core $n$. To one end of the coil is connected the main line M. The other end of the coil is connected with a condenser C², and the condenser is connected to earth. The coil carries a contact-arm G, of any suitable conducting material, which extends from the coil between two contacts $g$ $g'$. To the contact $g$ is connected one of the poles of a battery I, the opposite poles of said battery being grounded. A conductor $g^2$ connects said arm G with one binding-post $h$ of a recording device H, and the other post $h'$ is connected to earth by conductor $h^2$. The recording device may be of any suitable construction, the device shown comprising a pair of electromagnets $f$, a pivoted bar $f'$, carrying at one end an armature $f^2$, adapted to be actuated by the magnets, and at its opposite end a marking-point $f^3$, arranged to form contact with a record-strip $f^4$ when the armature is attracted, said strip $f^4$ being drawn by any suitable means, such as clockwork, (not shown,) from its spool $f^5$ over the impression-roller $f^6$ of the recording device. A spring $f^7$ serves to withdraw the arm when no current is passing through the coils of the magnets $f$.

When it is desired to send a message, the key D, which is retained by a spring $d'$ normally upon contact $e$, is depressed, whereby connection with said contact is broken, connection with $d$ formed, and a positive current permitted to flow from battery F through the relays A and B and condenser C to earth. By this current the armature of the relay A is caused to swing into contact with its active contact $a^2$. The effect of the condenser C in the circuit is to render the action of the armature a momentary one. The armature does not remain upon the contact $a^2$, but immediately returns to its position of rest upon the other contact $a^4$. The relay B during this time is not actuated. The momentary connection of the armature $a^3$ and contact $a^2$ permits a current to flow from battery A' through armature $a^3$ and the main line, causing the coil N' to swing and the arm G to form connection with the contact $g$, whereby a current is allowed to pass from battery I through said arm and the conductor $g^2$ to post $h$ through the coils of the magnets $f$ and out through post $h'$ and conductor $h^3$ to earth. The magnets are thereby energized and the stylus $f^3$ brought in contact with the record-strip $f^4$ and the record made. The arm G remains in the position shown until positively actuated in the opposite direction by passage of an impulse of contrary sign through the coil N'.

Upon raising the key D from the position shown, so that contact with $d$ is broken and contact with $e$ formed, a negative current passes from battery E through earth and conductor $e'$ to condenser C. The same being positively charged from the preceding current is now discharged. This discharge takes place in the same direction as the current of battery E and passes with the current through the relays A and B, whereby the relay B is actuated and its armature $b^3$ brought into connection with active contact $b^2$, the relay A remaining at rest, with its armature on contact $a^4$. Owing to the presence of the condenser C in the circuit, however, this connection of $b^2$ and $b^3$ is momentary, and the resulting current in the main line from battery B' is of approximately the same duration as the preceding current from battery A', first described, though of opposite direction. By said current from B', which follows the same course as the former current from A', the coil N' is caused to oscillate and swing the arm G from the contact $g$ to $g'$, where it remains until again actuated by passage of a current from A'. No current is during this time passing through the magnets $f$, and the stylus $f^3$ remains out of contact with the record-strip. When the key D is again depressed upon contact $d$, the same operation as first described takes place. By proper operation of the key D marks of different lengths are produced on the record-strip. The advantage of my improved apparatus lies in the fact that the impulses imparted to the main line are all of equal duration and alternating polarity, so that the impulses are instantly transmitted even over lines of great length, and the disadvantages due to the attenuation of the current, resulting from the great static capacity of the line, are entirely avoided.

Having thus described my invention, I claim as new and desire to secure by Letters Patent—

An electric-telegraph apparatus, consisting of a transmitting-key, two contacts therefor, two independent batteries grounded at opposite poles and connected at their other poles one with each contact, two oppositely-polarized relays, a conductor connecting the coils of said relays, a conductor connecting said key with one of said relays, a condenser, a conductor connecting the other relay with the condenser, a conductor grounding said condenser, a main line connected with the armature of each relay, two independent batteries grounded at opposite poles and connected at their other poles one with each of the active contacts of said relays, a condenser in the main line at the transmitting end, a permanent magnet, a coil pivoted between the poles of said magnet and connected at one end with the main line, a condenser, a conductor connecting the opposite end of said coil with said condenser, a conductor connecting said condenser to earth, a contact-arm extending from said coil, contacts for said arm, a battery grounded at one pole and connected at the other pole with one of said contacts, a recording device, a conductor connecting said contact-arm with said recording device, and a conductor connecting said recording device to earth, substantially as set forth.

In testimony that I claim the foregoing as my invention I have signed my name in presence of two subscribing witnesses.

PIERRE PICARD.

Witnesses:
EDWARD P. MACLEAN,
ANTOINE ROUSSAUNORT.